(12) United States Patent
Fu et al.

(10) Patent No.: US 9,953,440 B2
(45) Date of Patent: Apr. 24, 2018

(54) METHOD FOR TOMOGRAPHIC RECONSTRUCTION

(71) Applicant: GENERAL ELECTRIC COMPANY, Schenectady, NY (US)

(72) Inventors: Lin Fu, Niskayuna, NY (US); Bruno Kristiaan Bernard DeMan, Clifton Park, NY (US); Jed Douglas Pack, Glenville, NY (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 14/597,896

(22) Filed: Jan. 15, 2015

(65) Prior Publication Data

US 2016/0210762 A1 Jul. 21, 2016

(51) Int. Cl.
*G06T 11/00* (2006.01)

(52) U.S. Cl.
CPC ....... *G06T 11/006* (2013.01); *G06T 2211/421* (2013.01); *G06T 2211/424* (2013.01)

(58) Field of Classification Search
None
See application file for complete search history.

(56) References Cited

U.S. PATENT DOCUMENTS

| 6,249,595 | B1 | 6/2001 | Foxall et al. |
| 7,885,371 | B2 | 2/2011 | Thibault et al. |
| 8,588,493 | B2 | 11/2013 | Bruder et al. |
| 8,705,831 | B2 | 4/2014 | Koehler et al. |
| 2006/0072801 | A1* | 4/2006 | Bernard Deman ... G06T 11/006 382/131 |
| 2008/0069294 | A1* | 3/2008 | Wigstrom ............ A61B 6/032 378/4 |
| 2010/0054394 | A1* | 3/2010 | Thibault ............. G06T 11/006 378/8 |
| 2012/0141006 | A1 | 6/2012 | Koehler et al. |
| 2012/0308102 | A1* | 12/2012 | Pack .................... G06T 11/006 382/131 |
| 2013/0202166 | A1* | 8/2013 | Koehler ............... G06T 11/006 382/128 |
| 2014/0153690 | A1 | 6/2014 | Claus et al. |
| 2014/0177794 | A1 | 6/2014 | DeMan et al. |

OTHER PUBLICATIONS

Kudo et al. "New approximate filtered backprojection algorithm for helical cone-beam CT with redundant data", 2003, http://ieeexplore.ieee.org/xpls/icp.jsp?arnumber=1352581&tag=1#ref_1.*

Shechter, G., et al.; "The frequency split method for helical cone-beam reconstruction", Med. Phys. 31 (8), Aug. 2004, pp. 2230-2236.

(Continued)

*Primary Examiner* — Matthew Bella
*Assistant Examiner* — Brian Shin
(74) *Attorney, Agent, or Firm* — Pabitra K. Chakrabarti (57) ABSTRACT

The present approaches relate to frequency-split iterative reconstruction approaches. In some embodiment, such approaches provide for the combination of the low frequency components of an analytical reconstruction (e.g., a filtered back projection) and the high frequency components of an iterative reconstruction. In certain embodiments, frequency-split iterative reconstruction is used for generating region of interest images.

12 Claims, 8 Drawing Sheets

(56) References Cited

OTHER PUBLICATIONS

La Reviere, Patrick J.; "Monotonic iterative reconstruction algorithms for targeted reconstruction in emission and transmission computed tomography", IEEE Nuclear Science Symposium Conference Record, M12-8, 2006, pp. 2924-2928.
Stearns, Charles W., et al.; "An efficient algorithm for targeted reconstruction of tomographic data", IEEE Nuclear Science Symposium Conference Record, M11-395, 2006, pp. 2808-2811.
Rashed, Essam A., et al.; "Practical statistical models for region-of-interest tomographic reconstruction and long object problem", IEEE Nuclear Science Symposium Conference Record, M18-266, 2007, pp. 3505-3511.
Ziegler, Andy, et al.; "Iterative reconstruction of a region of interest for transmission tomography", Med. Phys. 35 (4), Apr. 2008, pp. 1318-1327.
Hamelin, Jean-Pierre, et al.; "Design of iterative ROI transmission tomography reconstruction procedures and image quality analysis", Med. Phys. 37 (9), Sep. 2010, pp. 4577-4589.

\* cited by examiner

METHOD FOR TOMOGRAPHIC RECONSTRUCTION

BACKGROUND

The subject matter disclosed herein relates to tomographic reconstruction, and in particular to tomographic reconstruction of a region of interest using iterative approaches.

Non-invasive imaging technologies allow images of the internal structures or features of a patient to be obtained without performing an invasive procedure on the patient. In particular, such non-invasive imaging technologies rely on various physical principles (such as the differential transmission of X-rays through the target volume, the reflection of acoustic waves within the volume, the paramagnetic properties of different tissues and materials within the volume) to acquire data and to construct images or otherwise represent the observed internal features of the patient.

Typically, only a small region (i.e., a region of interest) may be of clinical interest when a patient undergoes imaging. Further, in some circumstances it may be desirable to employ an iterative reconstruction approach to reconstructing the localized region of interest. In practice, however, such iterative reconstruction approaches require reconstruction of the entire volume to avoid data truncation related artifacts. It may, therefore, be desirable to improve on the reconstruction of a region of interest using limited data and/or in a less computationally intensive manner.

BRIEF DESCRIPTION

In one embodiment, a reconstruction method is provided. In accordance with this method, an analytic image reconstruction or other non-computationally intensive technique is performed on all or part of a set of projection data and a set of low frequency components are derived from the analytic image reconstruction or other non-computationally intensive techniques. An iterative image reconstruction is performed and at least a set of high frequency components are derived from the iterative image reconstruction. The analytically-derived or other non-computationally-intensive techniques-derived set of low frequency components and the iteratively-derived set of high frequency components are used to generate an output image.

In a further embodiment, an image processing system is provided. In accordance with this embodiment, the imaging processing system includes a memory storing one or more routines and a processing component configured to access previously or concurrently acquired projection data and to execute the one or more routines stored in the memory. The one or more routines, when executed by the processing component: perform an analytic image reconstruction from all or part of a set of projection data and derive at least a set of low frequency components from the analytic image reconstruction; perform an iterative image reconstruction and derive at least a set of high frequency components from the iterative image reconstruction; and use the analytically-derived set of low frequency components and the iteratively-derived set of high frequency to generate an output image.

In an additional embodiment, a reconstruction method is provided. In accordance with this method, a set of projection data is accessed. As part of a low frequency path: an analytic reconstruction or other non-computationally intensive technique is performed to generate an initial image; the initial image is reprojected to generate a subset of projections; and the subset of projections is low-pass filtered to generate a low-pass filtered subset of projections. As part of a high frequency path: the set of projection data is high pass filtered to generate a high-pass filtered set of projections. The low-pass filtered subset of projections and the high-pass filtered set of projections are combined to generate a synthesized set of projections. The synthesized set of projections are iteratively reconstructed to generate an output image.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One reconstruction technique used in CT imaging is iterative reconstruction. Use of iterative reconstruction techniques (in contrast to analytical methods) may be desirable for a variety of reasons. Such iterative reconstruction methods are based on discrete-discrete imaging models and provide a variety of advantages, such as being flexible in handling data with truncations. For example, if some projections are missing due to truncation, corresponding rows in system projection matrix can be simply removed, and no further modification to the algorithm is required. Thus, such iterative approaches are based on more realistic modeling of the system optics and noise statistics and usually achieve superior image quality.

There are various known issues with respect to the application of iterative reconstruction methods to region of interest (ROI) reconstruction problems. For example, one limitation of conventional iterative reconstruction methods is that, although only a ROI image may be needed for clinical use, the whole object still must be included in the reconstruction, regardless of the size of the ROI. The problem is illustrated in a two-dimensional context in FIG. 1.

Figure 1:
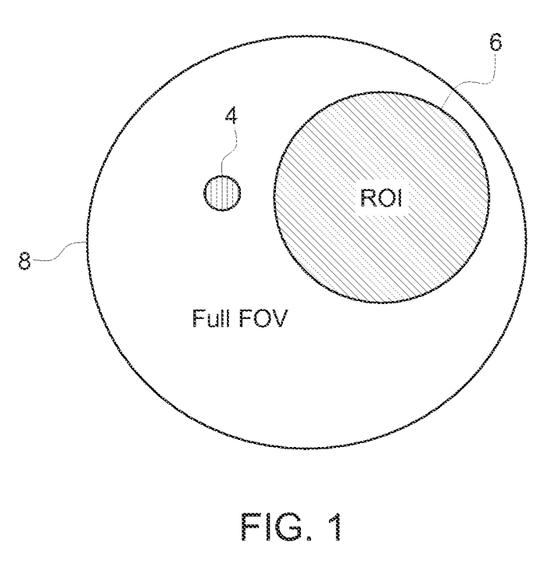
FIG. 1 depicts a region of interest within a field of view, in accordance with aspect of the present disclosure.

With reference to FIG. 1, suppose that an image of a ROI 6 within the larger field of view 8 is desired. It may be desired to perform an iterative reconstruction is performed only over the ROI, without accounting for any non-ROI objects 4, but while maintaining the superior image quality of the conventional iterative reconstruction in the ROI. However, if iterative reconstruction is naively performed only over the ROI 6 without accounting for the non-ROI object 4, artifacts will be caused. This is because there does not exist any ROI image whose reprojection can match the truncated projection measurement. That is, the truncated projection data does not satisfy the consistency condition of a sinogram. While FIG. 1 simplifies the problem by presenting it in a two-dimensional context, it should be appreciated that, in a three-dimensional (3D) context, the problem is expanded due to the corresponding cone beam geometry, which can lead to artifacts throughout the 3D volume.

Thus, it should be appreciated that iterative reconstruction, is inherently "global" in that the whole object needs to be modeled for reconstruction, regardless of the size of the ROI. For example, clinical diagnostic CT scanners have a bore size of about 70 cm in diameter, but the diameter of the prescribed imaging ROI is only around 35 cm for an abdomen study, 20 cm for a cardiac study, and 5 cm for an inner ear study. Using conventional approaches, even in the case of a 5-cm ROI, iterative reconstruction must still be performed over the 70 cm FOV. That is, all non-ROI objects (such as the patient body, the patient bed, blankets, head support pillows, catheters, and so forth) are included in the reconstruction so as to properly account for all absorption that contributes to the detector measurements in the forward model.

Therefore iterative reconstruction is conventionally performed in a brute-force manner in which the whole object is reconstructed so as to account for all observed absorption. Adding to this inefficiency, typically the imaged regions corresponding to non-ROI objects will be discarded after the computation finishes and not be shown to radiologists. Thus, such a brute-force approach is clearly inconvenient and not computationally economical.

Some methods, based on multi-resolution and/or multi-stage schemes, have been proposed to reduce the computation cost of ROI iterative reconstruction. However, these methods remain more computationally expensive compared to directly reconstructing the ROI using analytic approaches. In addition, these methods are still inherently constrained by the need to include non-ROI objects in the forward model in one way or another. Some other methods perform FBP reconstruction for a full FOV, then the reprojection of these non-ROI objects is subtracted from original projection data to allow iterative reconstruction to be directly performed in the ROI. However, these methods are problematic in situations where some objects are outside the imaging FOV. This is called object truncation. Axial truncation of the patient body happens in clinical CT scans. Trans-axial truncation for the patient bed, blankets, head support pillows, catheters, and so forth also happens. In the situation of object truncation, FBP is not sufficient to accurately reconstruct the truncated region of the object, thus these truncated objects cannot be properly handled and the sinogram subtraction method is not effective anymore.

With the preceding in mind, the present discussion relates various frequency-split iterative reconstruction approaches that allow iterative reconstruction to be performed directly on a region of interest, eliminating the need to include the whole object in the computation. By way of example, high- and low-frequency constituents of the ROI may be reconstructed separately in accordance with certain of these approaches. In such implementations, iterative reconstruction may be performed only for the high-spatial-frequency constituent of the ROI, and the low-frequency constituent may be obtained by analytic reconstruction or other simplified iterative approaches. In this manner reconstruction of the high frequency contents requires only "local" projection data associated with the ROI, and thus allows direct ROI reconstruction. Though ROI implementations are primarily discussed herein, it is also possible to apply this approach to a full field of view. In such implementations, the benefits may not be in computational savings, but possibly in the reduction of certain low frequency artifacts which are better handled by analytic reconstruction.

As discussed herein, frequency-split reconstruction, whether for a full field of view or a ROI, can be performed in conjunction with existing iterative reconstruction algorithms. In such implementations, frequency-split reconstruction simplifies the reconstruction workflow and computation cost of CT reconstruction, especially for small targeted ROIs in high resolution applications such as inner ear or cardiac. The present approaches can also greatly improve parallelism of CT reconstruction by allowing independent block-based processing. In particular, ROI iterative reconstruction, as discussed herein, allows for an increase in parallelism by allowing different ROIs to be reconstructed independently, i.e., processing of each ROI can be handled separately and in parallel. Further, ROI model-based iterative reconstruction enables simultaneous updates of multiple image blocks, which may increase the processing speed using existing block-based algorithms. A further advantage of block-based reconstruction is that each sub problem becomes less ill-conditioned as the block size becomes smaller. This promises faster convergence rate and fewer iteration are needed once ROI iterative reconstruction is combined with block-based processing.

The approaches described herein may be suitable for use with a range of image reconstruction systems. To facilitate explanation, the present disclosure will primarily discuss the present reconstruction approaches in one particular context, that of a CT system. However, it should be understood that the following discussion may also be applicable to other image reconstruction modalities and systems as well as to non-medical contexts or any context where an image is reconstructed from projections.

Figure 2:
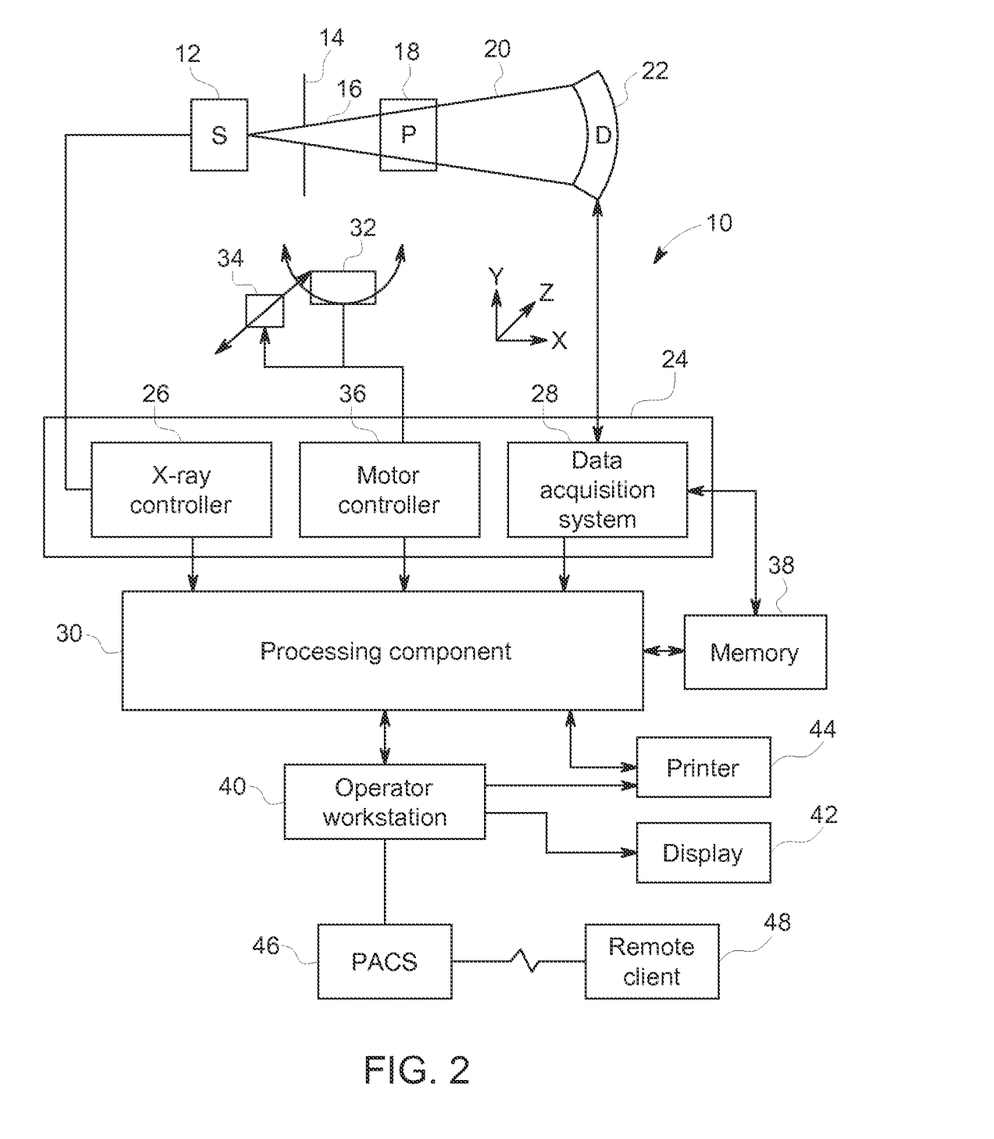
FIG. 2 is a block diagram depicting components of a computed tomography (CT) imaging system, in accordance with aspect of the present disclosure.

With this in mind, an example of a computer tomography (CT) imaging system 10 designed to acquire X-ray attenuation data at a variety of views around a patient (or other subject or object of interest) and suitable for frequency-split ROI image reconstruction is provided in FIG. 2. In the embodiment illustrated in FIG. 2, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences, including acquisition of 2D localizer or scout images used to identify anatomy of interest within the patient for subsequent scan protocols. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 2, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at one or more views relative to the subject. In the present context, system controller 24 may also include signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images in accordance with the presently disclosed algorithms. The processing component 30 may be one or more general or application-specific microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

As discussed herein, the system of FIG. 2 may be utilized to acquire images of a region of interest of a patient and/or to reconstruct such images. In particular, projection data acquired by a system such as the imaging system 10 may be reconstructed using a frequency-split iterative reconstruction approach that allows iterative reconstruction to be performed directly over a region of interest (ROI), eliminating the need to include non-ROI objects in the computation. The present approach is based on the premise that the artifacts inside ROI due to non-ROI objects are mainly low frequency in nature, but the high frequency contents (such as edges and noise texture) should not be sensitive to non-ROI objects (at least inside the ROI, away from the boundary of the ROI). This observation is consistent with analytic analysis of the interior problem, which states that the null space of the interior problem should only be low frequency. Conceptually, the present approaches reject low frequency interference from non-ROI objects, but still allow low frequency information in the ROI be incorporated into the final image solution.

In certain implementations, high- and low-frequency constituents of the ROI may be reconstructed separately. For example, high-frequency constituent of the ROI may be obtained by iterative reconstruction, while the low-frequency constituent may be obtained by analytic reconstruction or simplified iterative approaches. In such an implementation, and as discussed herein, reconstruction of the high frequency contents requires only "local" projection data associated with the ROI, thus allowing direct ROI reconstruction without modeling of the non-ROI objects and eliminating the need to include the whole object in reconstruction. The final reconstructed ROI image will conceptually be the combination of the low-frequency constituents (which may be reconstructed using filtered back projection (FBP) or other non-computationally intensive techniques) and the high frequency-constituents reconstructed using iterative reconstruction.

The present approach of frequency-split reconstruction can be combined with any existing iterative reconstruction algorithm. Further, such implementations simplifies the reconstruction workflow and computation cost of computed tomography (CT) iterative reconstruction, especially for small target regions of interest in high resolution applications, such as inner ear and cardiac imaging. When implemented, the present approaches can also improve parallelism of CT reconstruction by allowing independent block-based processing.

With the preceding in mind, a variety of algorithmic implementations are described below. In addition, the results on an actual implementation are provided, demonstrating that the described approach yields visually the same image as a conventional brute-force whole-object iterative reconstruction.

Figure 3:
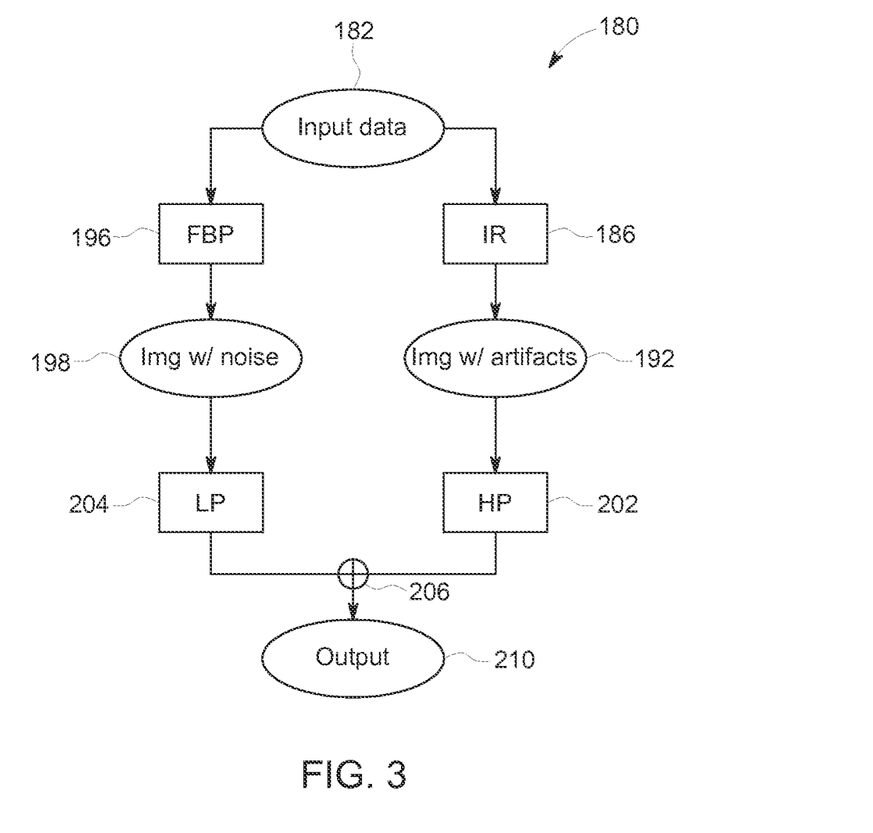
FIG. 3 depicts a process flow of one embodiment of an algorithm for performing frequency split iterative reconstruction, in accordance with aspect of the present disclosure.

Turning to FIG. 3, a post-reconstruction blending implementation 180 is described in terms of a process flow diagram. In this example, input data 182 (e.g., projection data over a field of view acquired using a CT scan, such as a sinogram) is acquired or accessed. In one embodiment, a naïve ROI iterative reconstruction 186 is performed (i.e., the update of the iterative reconstruction is limited to the ROI, excluding the entire field of view), generating an image 192. The image 192 is not computationally intensive to generate but will likely include low-frequency artifacts.

In this example a filtered backprojection 196 (or other analytic reconstruction) is also performed (either in parallel, as shown, or in series). The output of the backprojection 196 is an image 198 which may include high-frequency noise components. In this example, as a post-reconstruction step, iteratively reconstructed image 192 may be high-pass filtered 202 to screen out low frequency image components (e.g., data truncation artifacts). Conversely, the filtered backprojected image 198 is low-pass filtered 204 to screen out high frequency image components (e.g., noise). The respective filtered images are then combined 206, thereby replacing the low-frequency component of iteratively reconstructed image 192 with the low-frequency component of filtered backprojected image 198 in the combined or blended output image 210. As will be appreciated, in such an implementation, the post-reconstruction filters are constructed so as to accommodate the space-variant and non-linear nature of the iterative reconstruction images.

In an alternative implementation a filtered back projection is used as prior knowledge to constrain the low frequency content of the iterative reconstruction performed on the ROI. For example, in one such implementation, the penalization term (e.g., the prior term or the regularization term) applied during iterative reconstruction may be designed so that the low frequency content of filtered backprojection image is used as prior information to guide the iterative reconstruction.

Figure 4:
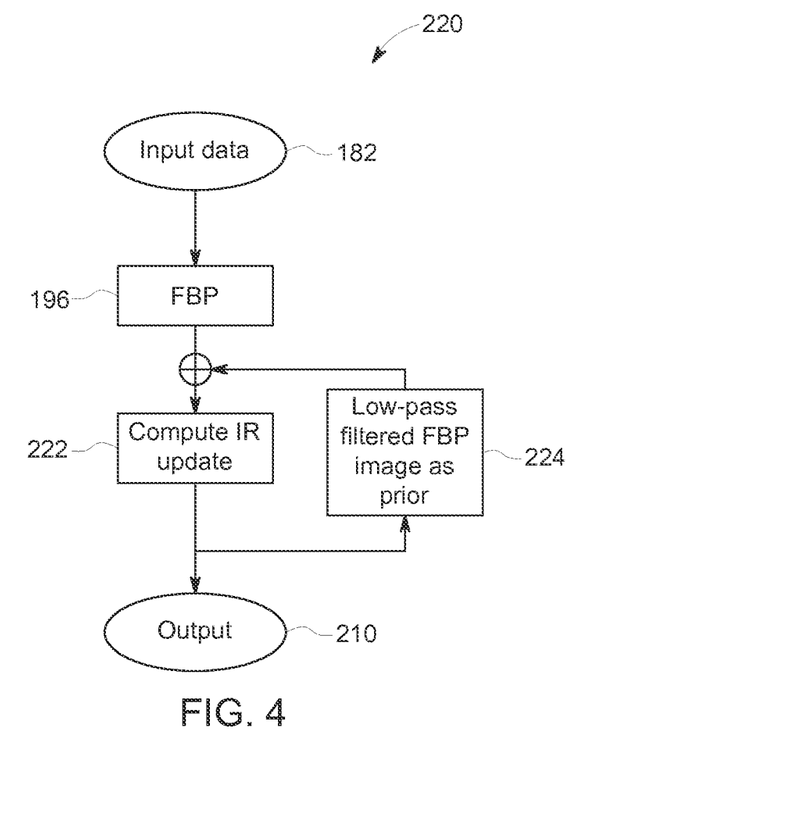
FIG. 4 depicts a process flow of a further embodiment of an algorithm for performing frequency split iterative reconstruction, in accordance with aspect of the present disclosure.

By way of example, and turning to FIG. 4, a process flow 220 is depicted corresponding to an algorithm for one such implementation. In this example, input data 182 (e.g., projection data over a field of view acquired using a CT scan) undergoes a filtered backprojection 196 to yield in initial image of the region of interest. An iterative reconstruction is then performed to update (step 222) the initial image, with an update image or volume being generated and applied each iteration to the current image until the iterative process is concluded. In this example the low-pass filtered content 224 of the filtered backprojection image is used as a prior or regularizer each iteration so as to limit the iterative reconstruction with respect to the low frequency content, in effect applying low frequency content information obtained from the filtered back projection into the iterative reconstruction process. Upon completion of the iterative update process, a region of interest image 210 is output.

In another implementation, low frequency changes to the image may be rejected during each iteration of the iterative reconstruction update process. For example, filtered back projection may be used to generate an initial image and iterative reconstruction used to generate a series of updates, with only the high frequency image constituents updated each iteration.

Figure 5:
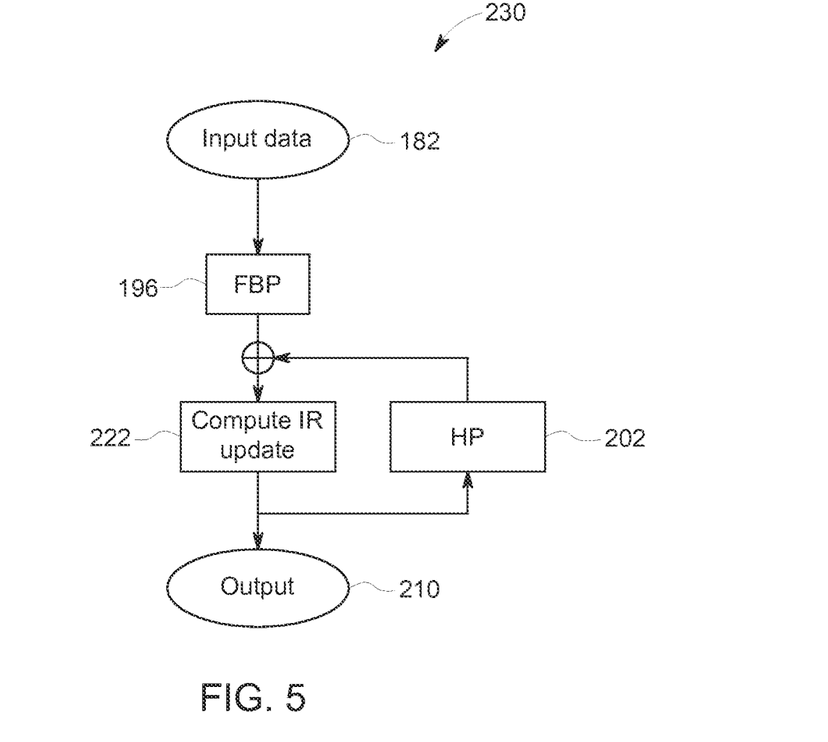
FIG. 5 depicts a process flow of another embodiment of an algorithm for performing frequency split iterative reconstruction, in accordance with aspect of the present disclosure.

By way of example, and turning to FIG. 5, a process flow 230 is depicted corresponding to an algorithm for one such implementation. In this example, input data 182 (e.g., projection data over a field of view acquired using a CT scan) undergoes a filtered backprojection 196 to yield in initial image of the region of interest. An iterative reconstruction is then performed to update (step 222) the initial image, with an update image or volume being generated and applied each iteration until the iterative process is concluded. In this example, each iterative update is high-pass filtered (step 202) and the high-pass filtered iterative update is applied to the current image, in effect applying high frequency content information obtained from each iteration to update the current image. Upon completion of the iterative update process, a region of interest image 210 is output.

In a further embodiment, rejection of low frequency artifacts may instead be accomplished during pre-processing of the sinogram. For example, in such an implementation, a synthesized sinogram is generated by combining the high frequency component of the raw projection data and the low frequency component of the re-projection of an ROI filtered back projection image. Iterative reconstruction is then performed from this synthesized sinogram.

Figure 6:
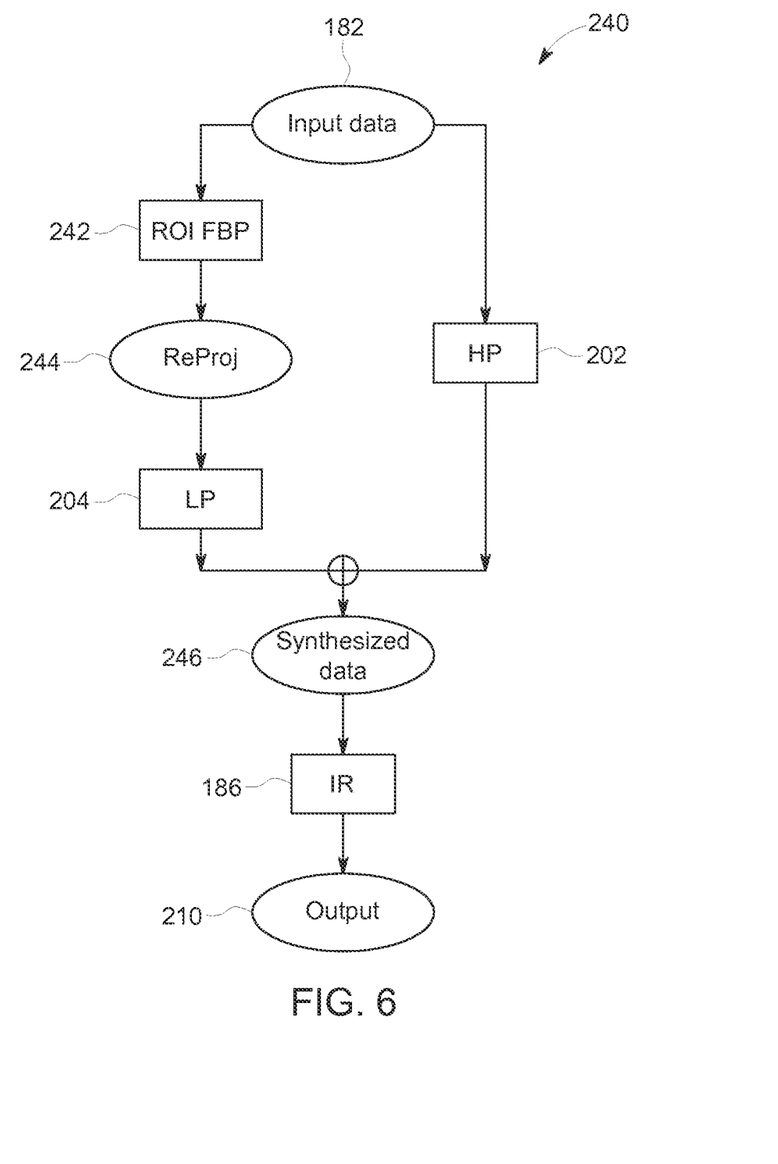
FIG. 6 depicts a process flow of an additional embodiment of an algorithm for performing frequency split iterative reconstruction, in accordance with aspect of the present disclosure.

Turning to FIG. 6 an example of a sinogram pre-processing implementation 240 is described in terms of a process flow diagram. In this example, input data 182 (e.g., a sinogram corresponding to the projection data over a CT scan field of view) is acquired or accessed. In one embodiment, the input data 182 (e.g., a sinogram) is subjected to a ROI filtered back projection process 242 to analytically generate a ROI image. The resulting ROI image in this example is reprojected (step 244) to generate a projection set corresponding to the ROI and this projection set is low-pass filtered.

In addition, in parallel (as shown) or sequential to these steps, the input data 182 undergoes high-pass filtering to generate a high-pass filtered sinogram corresponding to the entire field of view. In this example, the low-pass filtered projections corresponding to the ROI are combined with the high-pass filtered sinogram to generate a synthesized sinogram (i.e., synthesized data 246). The synthesized sinogram has the high frequency component of the raw projection data 182 and the low frequency component of the re-projection of ROI filtered back projection image. In the depicted example, the synthesized sinogram undergoes iterative reconstruction (step 186) to generate an iteratively reconstructed ROI image as output 210.

In a similar embodiment, sinogram pre-processing is used to reject low frequency artifacts. This implementation is similar to the preceding approach, except that the high and low frequency reconstructions are more independent. For example, in one implementation iterative reconstruction is only applied to the high frequency component, though information from the filtered backprojection may be used as configure or guide regularization of the iterative reconstruction, as discussed above.

Figure 7:
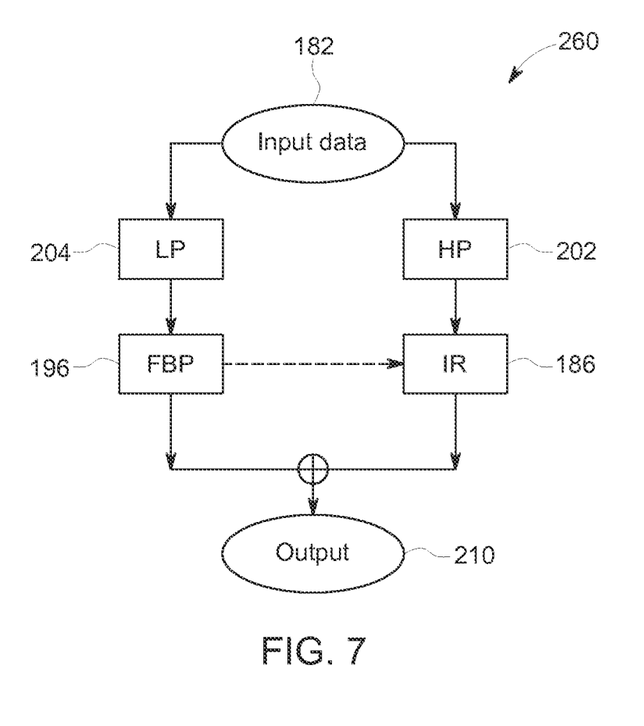
FIG. 7 depicts a process flow of a further embodiment of an algorithm for performing frequency split iterative reconstruction, in accordance with aspect of the present disclosure.

Turning to FIG. 7, an example of an additional sinogram pre-processing implementation 260 is described in terms of a process flow diagram. In this example, input data 182 (e.g., projection data over a field of view acquired using a CT scan, such as a sinogram) is acquired or accessed. In the depicted implementation, the input data is low-pass filtered 204, with the low-pass filtered projections then undergoing filtered back projection 196 to generate an image from the low frequency components of the projection data 182. As used herein, instances where filtered backprojection reconstruction is referenced or described can be generalized to other forms of analytic reconstruction methods or simplified iterative reconstruction methods, or other non-computationally intensive techniques.

Separately, the input data is high-pass filtered 202, with the high-pass filtered projections then undergoing an iterative reconstruction 186 to generate an image from the high frequency components of the projection data 182. As noted above, in certain implementations, and as shown, aspects of the filtered backprojection of the low frequency components may be incorporated into the iterative reconstruction, such as in the form of a regularizer or prior that is applied or referenced each iteration. In the depicted implementation, the respective images generated by the filtered back projection and iterative reconstruction are combined to form the output image 210.

The preceding discussion relates various implementations by which the present frequency split iterative reconstruction approach may be accomplished. To demonstrate the suitability of such approaches, a study was performed using the algorithm described above with respect to FIG. 6. In this study, projection data were acquired on a 64-slice GE CT 750 HD scanner at 120 kV and 660 mA and 0.5 sec/rot, with helical pitch of 0.5. The total Z coverage was 40 cm. The bore size of the scanner was 70 cm, but the reconstruction ROI prescribed by the radiologist was 36 cm, with a 512×512 grid and pixel size of 0.7 mm.

As noted above, a brute-force iterative reconstruction approach would need to reconstruct the 70 cm FOV plus the truncation region in Z. In contrast, the presently described ROI iterative reconstruction approach allows one-step ROI reconstruction directly over the 36 cm ROI, so that computation time will only be spent on images that are deemed significant.

Figure 8:
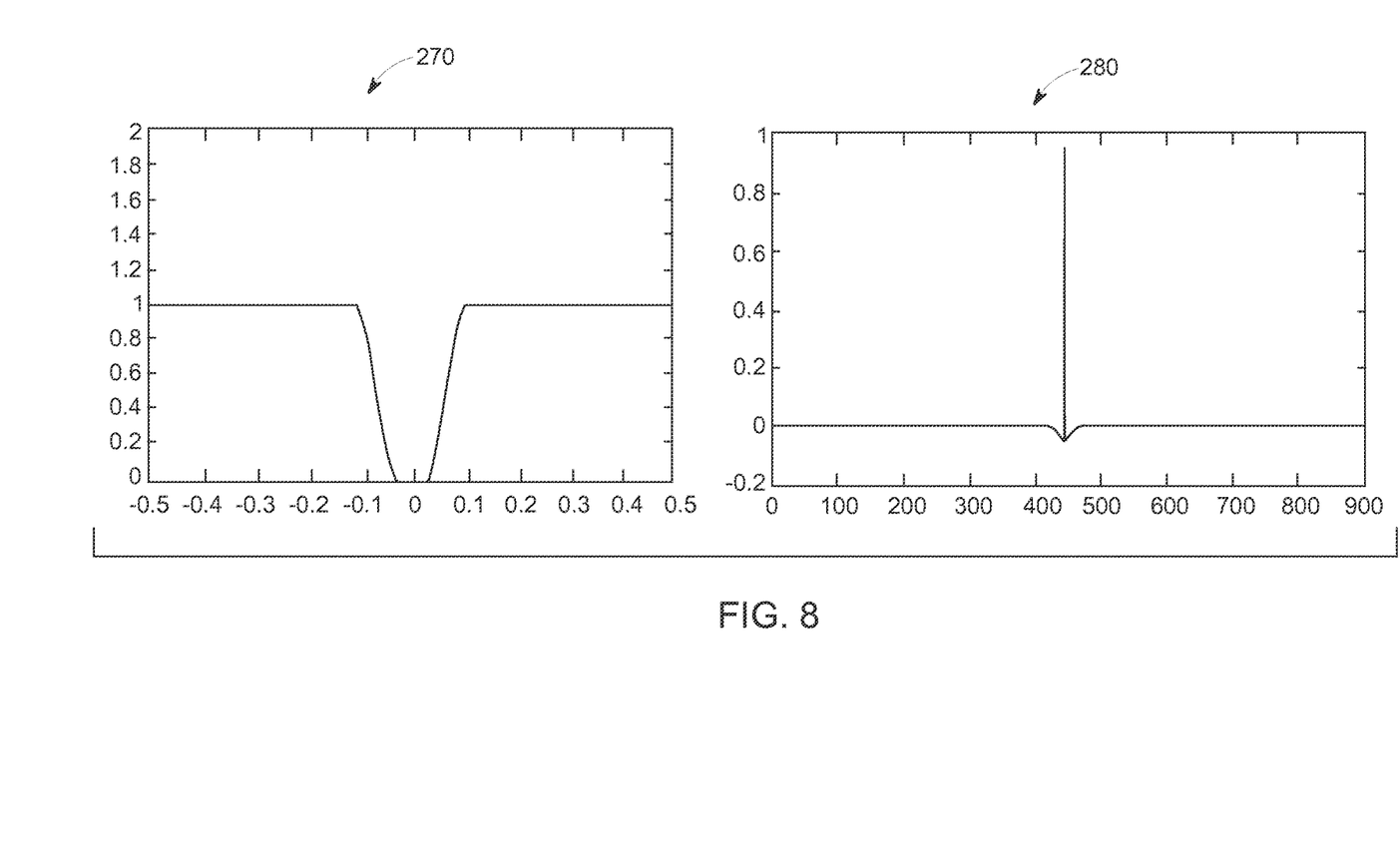
FIG. 8 depicts the frequency- and spatial-domain response of a high-pass filter, in accordance with aspect of the present disclosure.

To first reject low frequency information from the projection data 182, a high-pass filter was applied (step 202) in the sinogram space. FIG. 8 shows the frequency- and spatial-domain response of the filter employed in the study. In this example, the high-pass filter is one-dimensional and is applied along the detector channels. As shown in FIG. 8, the left-hand graph 270 depicts the frequency response of the high-pass filter in the sinogram space, which is used to reject low-frequency information from iterative reconstruction. The right-hand graph 280 depicts the space-domain filter, which can be seen to have very compact support, thus enabling ROI reconstruction.

As shown with respect to the algorithm of FIG. 6, the high-pass filtered sinogram is combined with the low-frequency information from filtered back projection reconstruction (step 242) of the ROI to form a new synthesized sinogram 246 to be used for ROI iterative reconstruction. For the purposes of the study, the new sinogram was generated by:

$$y_{roi} = \text{HiPass}(y_{orig}) + \text{LowPass}(y_{reproj}) \quad (1)$$

where the low-pass filter was defined as the complement of the high-pass filter, i.e., HighPass+LowPass=AllPass. In equation (1), $y_{roi}$ is the synthesized sinogram to be used for ROI iterative reconstruction, $y_{orig}$ is the original projection data, and $y_{reproj}$ is the reprojection of an ROI filtered back projection image. With respect to implementation of the algorithm, it should be noted that, with respect to the filter shown in FIG. 8, this filter should have a finite support, and boundary artifacts may occur when applying this filter at the edge of the field of view when extracting the low frequency constituents from the filtered back projection image. In one implementation, such boundary artifacts may be mitigated by enlarging the ROI by some limited number of pixels, so that the image in the original ROI is not affected by the boundary effect.

Alternatively, in another implementation, the boundary artifacts become less obvious when the Q factor of the filter degrades (i.e., more gradual transition band). Thus, a low-Q filter may be used for data that are close to the boundary. Doing so allows more high frequency information of the filtered back projection image to leak into the synthesized sinogram and will slightly degrade spatial resolution. However, this may be clinically acceptable since the degradation only happens at the boundary of the ROI.

It may be noted that, for some iterative reconstruction algorithms which use a quadratic data fit term, the generation of the synthesized sinogram, $y_{roi}$, is equivalent to applying a high-pass filter of the residual error sinogram when using the ROI filtered back projection image as initial. In this manner, little modification to a stock iterative reconstruction algorithm is needed in such an embodiment.

With respect to the results of the study, a 36-cm ROI and a 9-cm ROI were both iteratively reconstructed in accordance with the algorithm described in FIG. 6 using a stock preconditioned conjugate gradient algorithm, and which could be readily reconstructed by any other existing iterative reconstruction algorithms. Visually no difference was present between the iteratively reconstructed ROI images and images constructed from the same data using brute force iterative reconstruction of the entire field of view.

As discussed herein, frequency-split iterative reconstruction provides for the combination of the low frequency components of an analytical reconstruction (e.g., filtered back projection) and the high frequency components of iterative reconstruction. These approaches may offer the advantages of allowing the incorporation of existing correction algorithms for filtered back projection reconstruction (such as cone-beam artifacts, beam-hardening artifacts, motion artifacts) into iterative reconstruction. Further, the use of frequency-split iterative reconstruction provides a framework that improves the flexibility of iterative reconstruction. A technical effect of these approaches is the ability to reconstruct a ROI or full field of view image using iterative reconstruction techniques without employing multi-stage or multi-resolution steps; nor is padding of slices in the Z direction needed. These benefits simplify the reconstruction workflow, reduce the time- and memory complexity of iterative reconstruction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A reconstruction method, comprising:
performing an analytic image reconstruction or other non-computationally intensive techniques on all or part of a set of projection data and deriving a set of low frequency components from the analytic image reconstruction or other non-computationally intensive techniques, wherein the set of low frequency components comprise a limited subset of the total frequency components of the set of projection data;
performing an iterative image reconstruction and deriving at least a set of high frequency components from the iterative image reconstruction, wherein the set of high frequency components comprises a limited subset of the total frequency components of the set of projection data, wherein the set of low frequency components are used as a regularizer for the iterative image reconstruction, and wherein the analytic image reconstruction or other non-computationally intensive technique and the iterative image reconstruction are performed independent of and in parallel to one another; and
using the set of low frequency components and the set of high frequency components to generate an output image.

2. The method of claim 1, wherein the analytic image reconstruction comprises a filtered backprojection.

3. The method of claim 1, wherein deriving the set of low frequency components comprises applying a low-pass filter before or after the analytic image reconstruction.

4. The method of claim 1, wherein deriving the set of high frequency components comprises applying a high-pass filter before, after, or during iterations of the iterative image reconstruction.

5. The method of claim 1, wherein one or both of the analytic image reconstruction or the iterative image reconstruction are performed on a subset of the set of projection data corresponding to a region of interest.

6. The method of claim 1, wherein the output image comprises a region of interest image corresponding to less than a field of view used to acquire the set of projection data.

7. The method of claim 1:
wherein performing the analytic image reconstruction and deriving the set of low frequency components comprises applying a low-pass filter to some or all of the set of projection data to generate a low-pass filtered projection set prior to performing filtered back projection on the low-pass filtered projection set to generate the set of low frequency components; and
wherein performing the iterative image reconstruction and deriving the set of high frequency components comprises applying a high-pass filter to some or all of the set of projection data to generate a high-pass filtered projection set prior to performing iterative reconstruction on the high-pass filtered projection set to generate the set of high frequency components.

8. The method of claim 1, wherein the non-computationally intensive techniques comprise low resolution iterative reconstruction.

9. An image processing system, comprising:
a memory storing one or more routines; and
a microprocessor configured to access previously or concurrently acquired projection data and to execute the one or more routines stored in the memory, wherein the one or more routines, when executed by the microprocessor:
perform an analytic image reconstruction from all or part of a set of projection data and derive at least a set of low frequency components from the analytic image reconstruction, wherein the set of low frequency components comprise a limited subset of the total frequency components of the set of projection data;
perform an iterative image reconstruction and derive at least a set of high frequency components from the iterative image reconstruction, wherein the set of high frequency components comprise a limited subset of the total frequency components of the set of projection data, wherein the set of high frequency components are used as a regularizer for the analytic image reconstruction, and wherein the analytic image reconstruction and the iterative image reconstruction are performed independent of and in parallel to one another; and
use the set of low frequency components and the set of high frequency to generate an output image.

10. The image processing system of claim 9, wherein the one or more routines, when executed:
perform the analytic image reconstruction and derive the set of low frequency components by performing filtered back projection on all or part of the set of projection data to generate a filtered back projection image and low-pass filtering the filtered back projection image to generate the set of low frequency components; and
perform the iterative image reconstruction and derive the set of high frequency components by performing the iterative image reconstruction on all or part of the set of projection data to generate an iteratively reconstructed image and high-pass filtering the iteratively reconstructed image to generate the set of high frequency components.

11. The image processing system of claim 9, wherein the one or more routines, when executed:
    perform the analytic image reconstruction and derive the set of low frequency components by applying a low-pass filter to some or all of the set of projection data to generate a low-pass filtered projection set and performing filtered back projection on the low-pass filtered projection set to generate the set of low frequency components; and
    perform the iterative image reconstruction and derive the set of high frequency components by applying a high-pass filter to some or all of the set of projection data to generate a high-pass filtered projection set and performing iterative reconstruction on the high-pass filtered projection set to generate the set of high frequency components.

12. The image processing system of claim 9, wherein one or both of the analytic image reconstruction or the iterative reconstruction are performed on a subset of the set of projection data corresponding to a region of interest.

\* \* \* \* \*